United States Patent [19]
Foster et al.

[11] Patent Number: 5,785,357
[45] Date of Patent: Jul. 28, 1998

[54] LOCKING JOINT

[75] Inventors: Eugene L. Foster, Alton Bay, N.H.; K. Douglass Lum, McLean, Va.

[73] Assignee: UTD, Inc., Newington, Va.

[21] Appl. No.: 668,279

[22] Filed: Jun. 21, 1996

Related U.S. Application Data

[63] Continuation-in-part of Ser. No. 532,502, Sep. 22, 1995, abandoned.

[51] Int. Cl.$^6$ ............................................. F16L 15/08
[52] U.S. Cl. ................. 285/92; 285/86; 285/322; 285/328; 285/330; 285/333; 285/906
[58] Field of Search ....................... 285/92, 322, 175, 285/906, 89, 323, 81, 390, 82, 330, 333, 334, 86, 328; 411/119, 120, 121; 403/320

[56] References Cited

U.S. PATENT DOCUMENTS

| | | | |
|---|---|---|---|
| 805,402 | 11/1905 | Akins | 285/390 X |
| 1,053,609 | 2/1913 | Keller | 285/175 X |
| 1,139,671 | 5/1915 | Goodall | 285/92 |
| 1,159,472 | 11/1915 | Christofferson | 403/320 X |
| 1,326,970 | 1/1920 | Row et al. | 285/175 X |
| 1,589,781 | 6/1926 | Anderson | 285/330 |
| 1,913,030 | 6/1933 | Hux | 285/390 X |
| 2,099,048 | 11/1937 | Burns et al. | 285/86 |
| 2,334,309 | 11/1943 | Brown | |
| 3,201,149 | 8/1965 | Bragg | 285/86 X |
| 3,326,581 | 6/1967 | Wong | |
| 3,401,371 | 9/1968 | Hammond | 403/320 X |
| 4,051,696 | 10/1977 | Mason et al. | |
| 4,693,498 | 9/1987 | Baugh et al. | |
| 4,790,571 | 12/1988 | Montanari et al. | |
| 5,046,763 | 9/1991 | Martucci et al. | |
| 5,165,727 | 11/1992 | Volley | 285/175 X |

FOREIGN PATENT DOCUMENTS

| | | | |
|---|---|---|---|
| 1288938 | 2/1962 | France | 285/89 |
| 4202772 | 8/1993 | Germany | 285/81 |
| 352880 | 12/1937 | Italy | 285/86 |
| 2112892 | 7/1983 | United Kingdom | 285/92 |

*Primary Examiner*—Dave W. Arola
*Attorney, Agent, or Firm*—Dickstein Shapiro Morin & Oshinsky LLP

[57] ABSTRACT

A threaded joint is provided with a locking mechanism for resisting loosening and over torquing. The joint has splines that are alignable with axially directed fingers, and shear plates that are movable into the spaces between the splines and the fingers. The shear plates may be supported by a shear ring. A lock ring may be provided for maintaining the shear plates between the respective spaces. Another embodiment of the joint has a knurled portion that is alignable with axially directed fingers. The joint also includes a clamp ring engageable with the fingers.

12 Claims, 14 Drawing Sheets

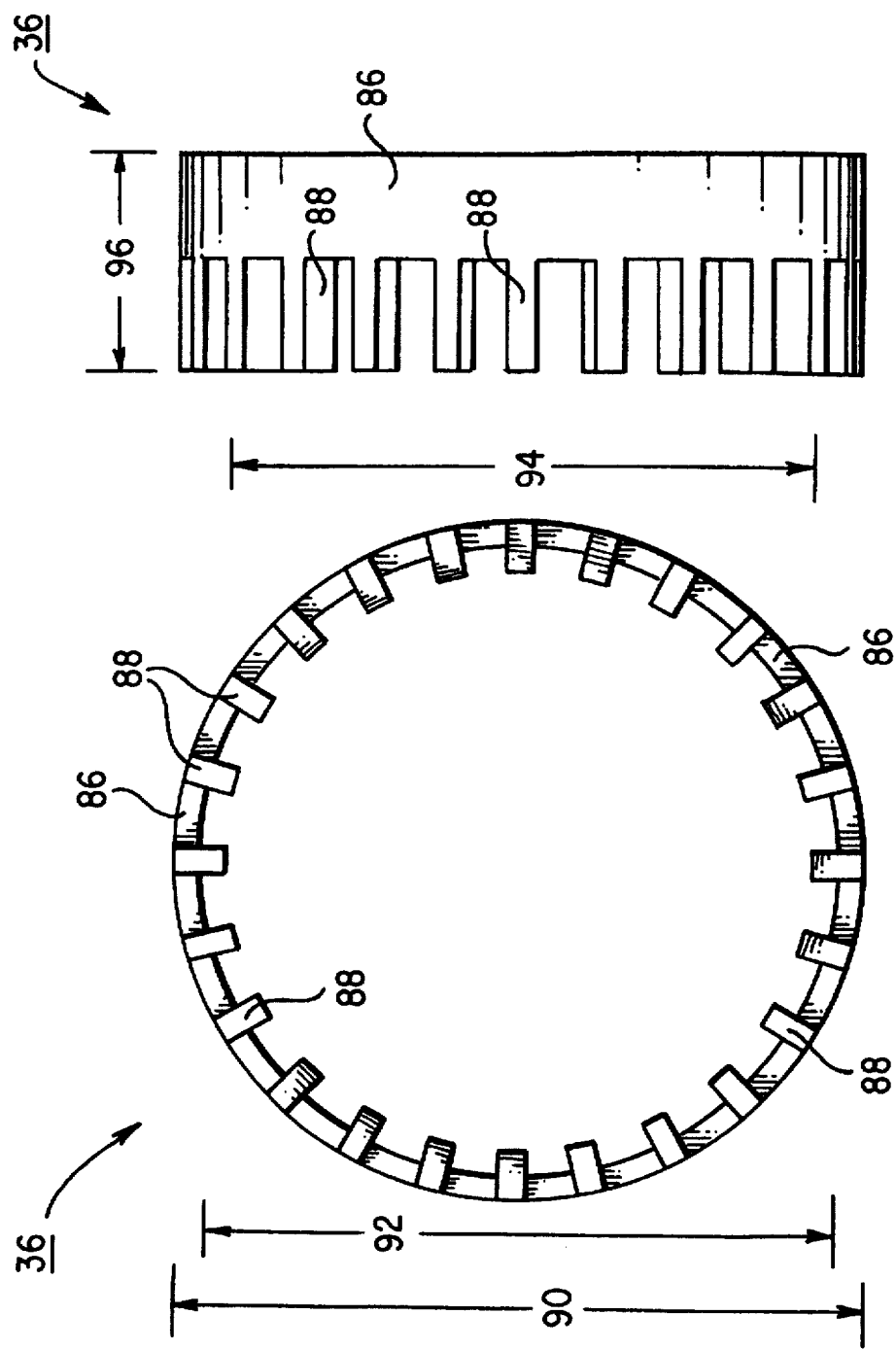

LOCKING JOINT

This is a continuation-in-part of application Ser. No. 08/532,502, filed Sep. 22, 1995, now abandoned, the entire disclosure of which is incorporated herein by reference.

BACKGROUND OF THE INVENTION

The present invention relates to a locking joint. More particularly, the present invention relates to a threaded joint for a penetrometer or drill rod, with the joint having a locking mechanism to prevent loosening or over-torquing of the joint.

In the drilling industry it is common to couple multiple pipe segments to achieve conduits having any length. There has been a problem preventing the pipe segments from decoupling when rotational force is applied to the conduit in a direction which will loosen or unscrew the joints.

Prior art systems have been devised to prevent the loosening and, thus, decoupling of a pipe joint during rotation of the pipe. One such prior art system is described in U.S. Pat. No. 4,693,498 which discloses an anti-rotation joint for connecting sections of conduits. The anti-rotation joint includes a threaded female end adapter for receiving a threaded male end adapter. A lock sleeve is provided having splines on its lower inner annular surface, which cooperate with splines on the female end adapter, to prevent rotation of the lock sleeve. The upper portion of the lock sleeve has radial slits forming resilient fingers. The inner arcuate surface of each finger has ratchet teeth for engaging ratchet teeth provided on the outer annular surface of the male end adapter. When the ratchet teeth of the lock sleeve are engaged with the ratchet teeth of the male end adapter, the lock sleeve can be rotated in a direction to tighten the joint but rotation in a direction to loosen the joint is prohibited.

The prior art devices are disadvantageous in that they are generally designed to resist torque in only one direction. In conduits where rotational force is to be applied in opposite directions at different times, the prior art locking pipe joints cannot prevent further tightening of the pipe joint.

Furthermore, the joints of the prior art are weaker than the pipes which they connect. Pipes connected by prior art joints cannot support the lateral loads borne by unjointed pipes unless they are reinforced in some manner at their joints. The need to reinforce joints adds to the expense of using jointed pipe and limits the situations in which jointed pipes can be used.

Another disadvantage of the joints in the prior art is their inability to reduce the friction on a penetrometer rod without the addition of another component. Penetrometer operators sometimes weld a separate oversized ring at every third joint in order to reduce friction. These additional parts and assembly steps make using the joints of the prior art cumbersome.

SUMMARY OF THE INVENTION

The present invention overcomes the limitations of the prior art pipe joints by providing a locking joint that resists loosening and over torquing. In one aspect of the invention, a locking joint is provided having a first end adapter threaded along a portion of its length and having a plurality of splines extending along a separate portion of its length. A second end adapter is provided with a threaded portion and a plurality of cantilevered fingers forming a castellated end. The threaded portion of the first end adapter is engageable with the threaded portion of the second end adapter. A shear ring having a plurality of annularly distributed shear plates is longitudinally movable into respective spaces between the splines of the first end adapter and the fingers of the second end adapter.

In another aspect of the invention, the locking pipe joint includes a lock ring for preventing movement of the shear ring and, thus, disengagement of the shear plates from between the splines on the first end adapter and the cantilevered fingers on the second end adapter.

In another embodiment of the present invention, a locking joint is provided having a first end adapter which is threaded along two portions of its length, and has a knurled portion located between the two threaded portions. A second end adapter is provided with a threaded portion and a plurality of cantilevered fingers forming a castellated end. One of the threaded portions of the first end adapter is engageable with the threaded portion of the second end adapter. A clamp ring having a screw thread formed in its inner surface is engageable with the other threaded portion of the first end adapter. This embodiment may be stronger than conventional joints and can be constructed nearly as strong as an unjointed pipe. In one aspect of the invention, this embodiment may be used to simulate the oversized rings that are welded to penetrometer rods to reduce the friction on the rod.

The present invention may be used with solid or hollow rods, and can duplicate to a close approximation the mechanical characteristics of the un-jointed rod. The present invention is easily assembled and maintains high flexural rigidity, combined with a locking feature which prevents the joint from accidentally loosening.

The present invention also relates to methods of making a locked joint. One method includes the steps of moving a shear ring on a male end adapter such that shear plates are engaged between annularly distributed splines. The male end adapter is connected to the female end adapter such that a threaded portion of the female end adapter engages a threaded portion of the male end adapter. Cantilevered fingers on the distal end of the female end adapter are then aligned with the splines on the male end adapter and the shear ring is slid toward the female end adapter to locate the shear plates between the splines and the cantilevered fingers.

Another method of making a locked joint includes the steps of screwing a clamp ring having a threaded inner surface onto a male end adapter such that the threaded inner surface engages a threaded portion of the male end adapter. The male end adapter is then connected to a female end adapter such that a threaded portion of the female end adapter engages another threaded portion of the male end adapter. The clamp ring is then unscrewed toward the female end adapter to cause cantilevered fingers on an end of the female end adapter to press against a contact portion of the male end adapter. The contact portion may be knurled to ensure no movement of the fingers relative to the male end adapter.

The present invention has particular utility in conjunction with a system for determining the path orientation of a passageway of the type disclosed in U.S. Pat. No. 5,193,628. The entire disclosure of U.S. Pat. No. 5,193,628 is incorporated herein by reference.

It is an object of the present invention to provide a locking joint which prevents both clockwise and counter-clockwise movement of the locking joint during rotation of the pipe assembly.

Another object of the invention is to provide a locking joint with high bending strength.

Another object of the invention is to provide an uncomplicated locking joint that is easy to assemble.

A further object of the present invention is to provide a locking joint which reduces friction, particularly friction on a penetrometer rod.

Other objects and advantages of the present invention will become apparent from the following detailed description and drawings which illustrate preferred embodiments of the present invention.

BRIEF DESCRIPTION OF THE DRAWINGS

FIG. 7 is an end view of the shear ring of the locking ring of FIG. 1.

FIG. 8 is a side elevation view of the shear ring of FIG. 7.

DETAILED DESCRIPTION OF PREFERRED EMBODIMENTS

Figure 1:
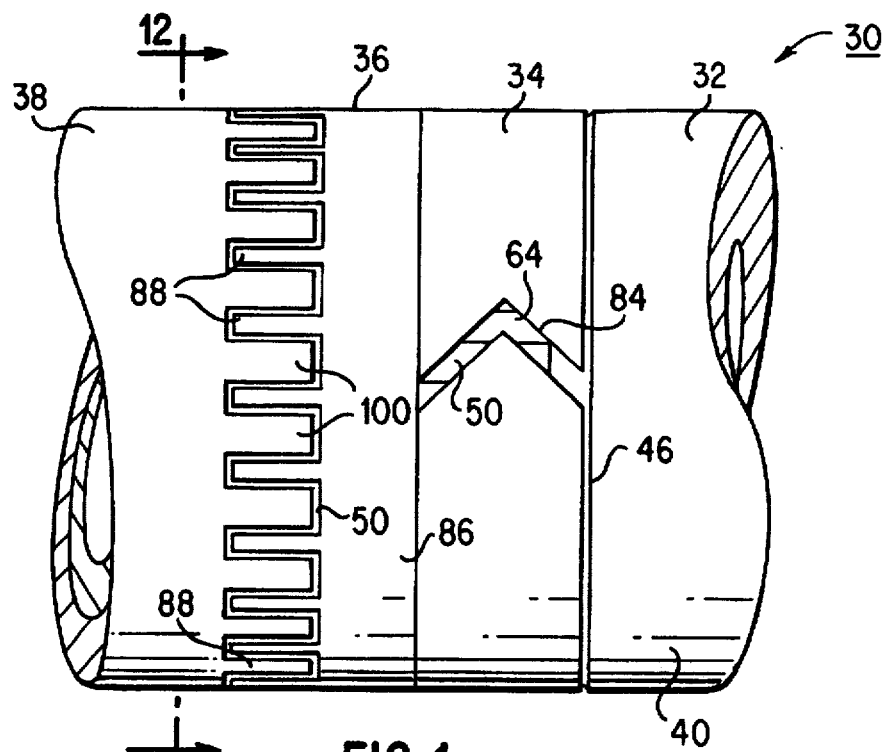
FIG. 1 is a side elevation view of a locking pipe joint in accordance with a preferred embodiment of the present invention.
Figure 12:
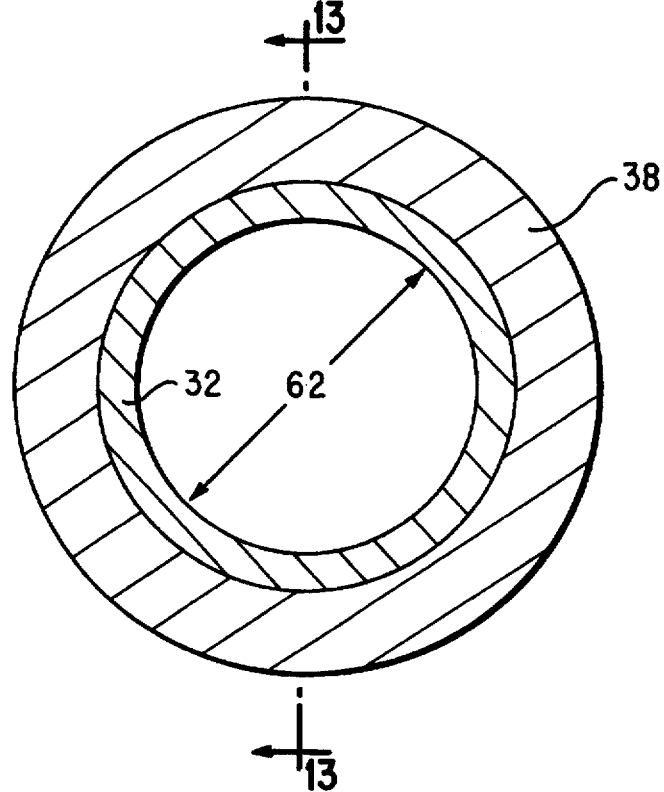
FIG. 12 is a sectional view of the locking pipe joint taken along the line 12—12 of FIG. 1.

Referring now to the drawings, wherein like numerals indicate like elements, there is shown in FIG. 1 a locking pipe joint 30 constructed in accordance with a preferred embodiment of the present invention. The locking pipe joint 30 includes a male end adapter 32, a locking ring 34, a shear ring 36, and a female end adapter 38.

Figure 2:
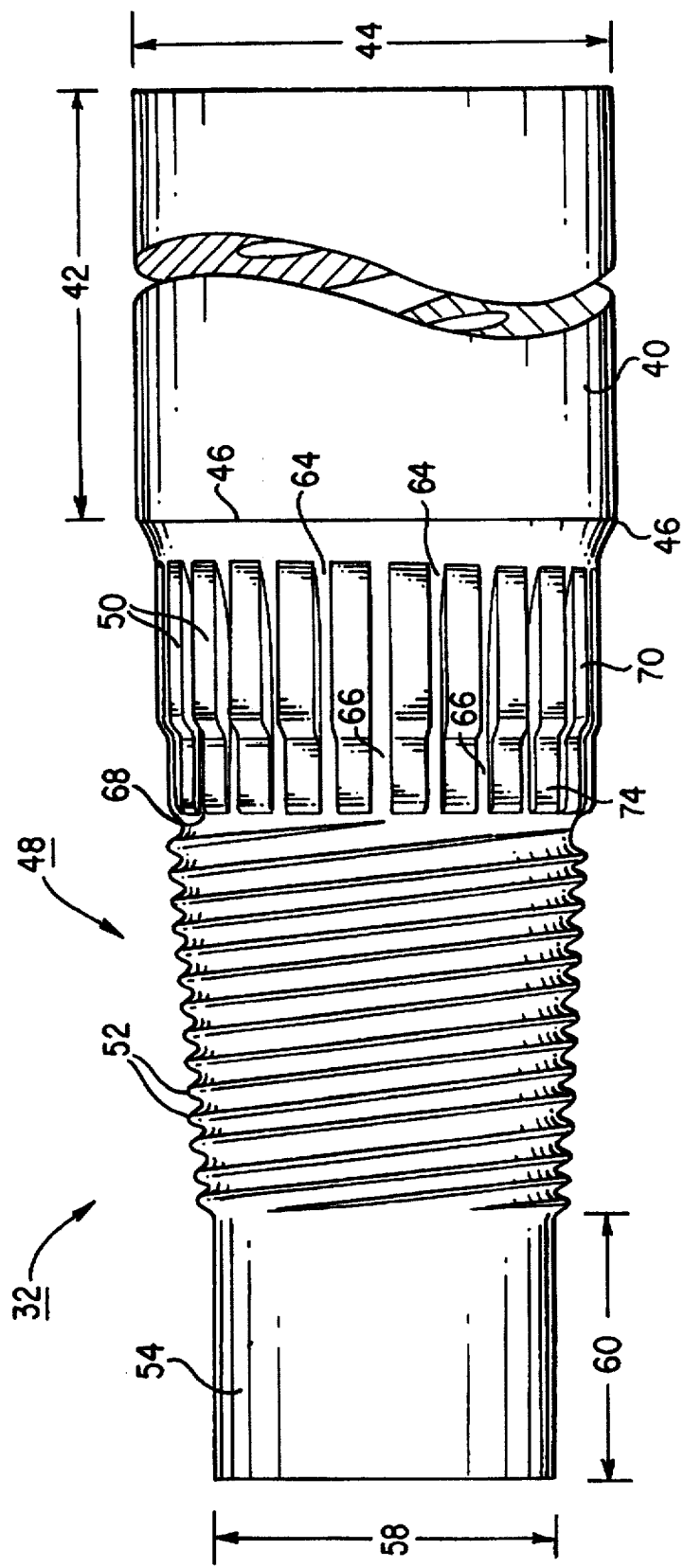
FIG. 2 is a side elevation view of the male end adapter of the locking pipe joint of FIG. 1.
Figure 3:
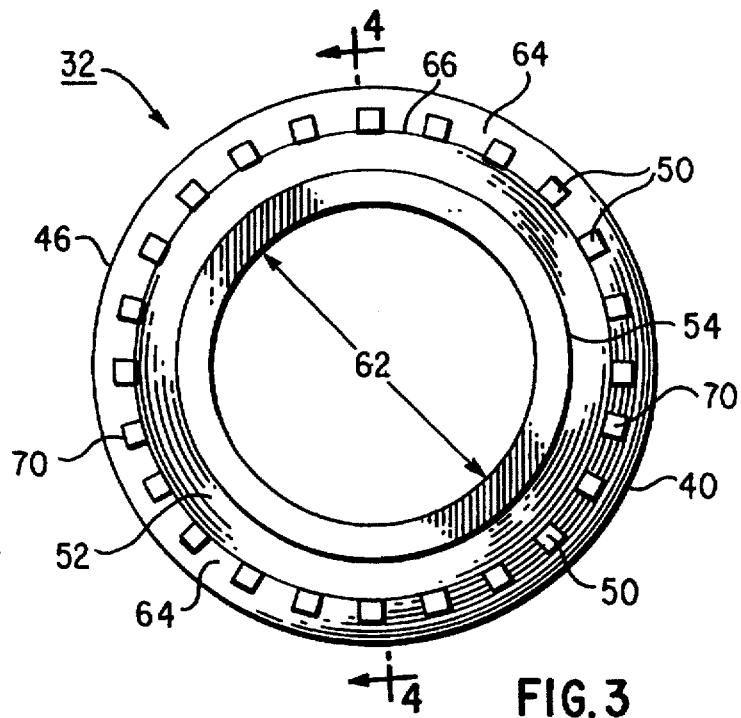
FIG. 3 is an end view of the male end adapter of FIG. 2.

The male end adapter 32 is depicted in FIG. 2. The male end adapter 32 includes a first cylindrical section 40 extending over a length 42 of the male end adapter 32. The first cylindrical tubular section 40 has an outer diameter 44 which is generally constant over its length 42. The first cylindrical section 40 terminates at a lip 46 formed at the edge of a tapered section 48 of the male end adapter 32. Formed within the tapered section 48 of the male end adapter 32 are splines 50, distributed annularly around the male end adapter 32, and a pair of tapered screw threads 52, e.g., double lead threads. There are twenty-four splines 50 distributed equi-angularly around the male end adapter 32.

The double lead construction of the threads 52 makes it possible to employ fine threads 52. The threads 52 are preferably as small as possible in the radial direction so that the adapters 32, 38 have the maximum possible section moduli. This minimizes stress levels. In addition, the double lead construction permits rapid assembly.

A second tubular section 54 extends longitudinally from the screw threads 52 to the terminal end of the male end adapter 32. The second tubular section 54 has an outer diameter 58 which is substantially constant along its length 60. The second tubular section 54 guides the adapters 32, 38 during assembly, thereby protecting the fine threads 52 from becoming crossed or stripped. The second tubular section 54 also helps support the moment carried by the joint 30, thereby reducing joint deflection under lateral loads.

Figure 4:
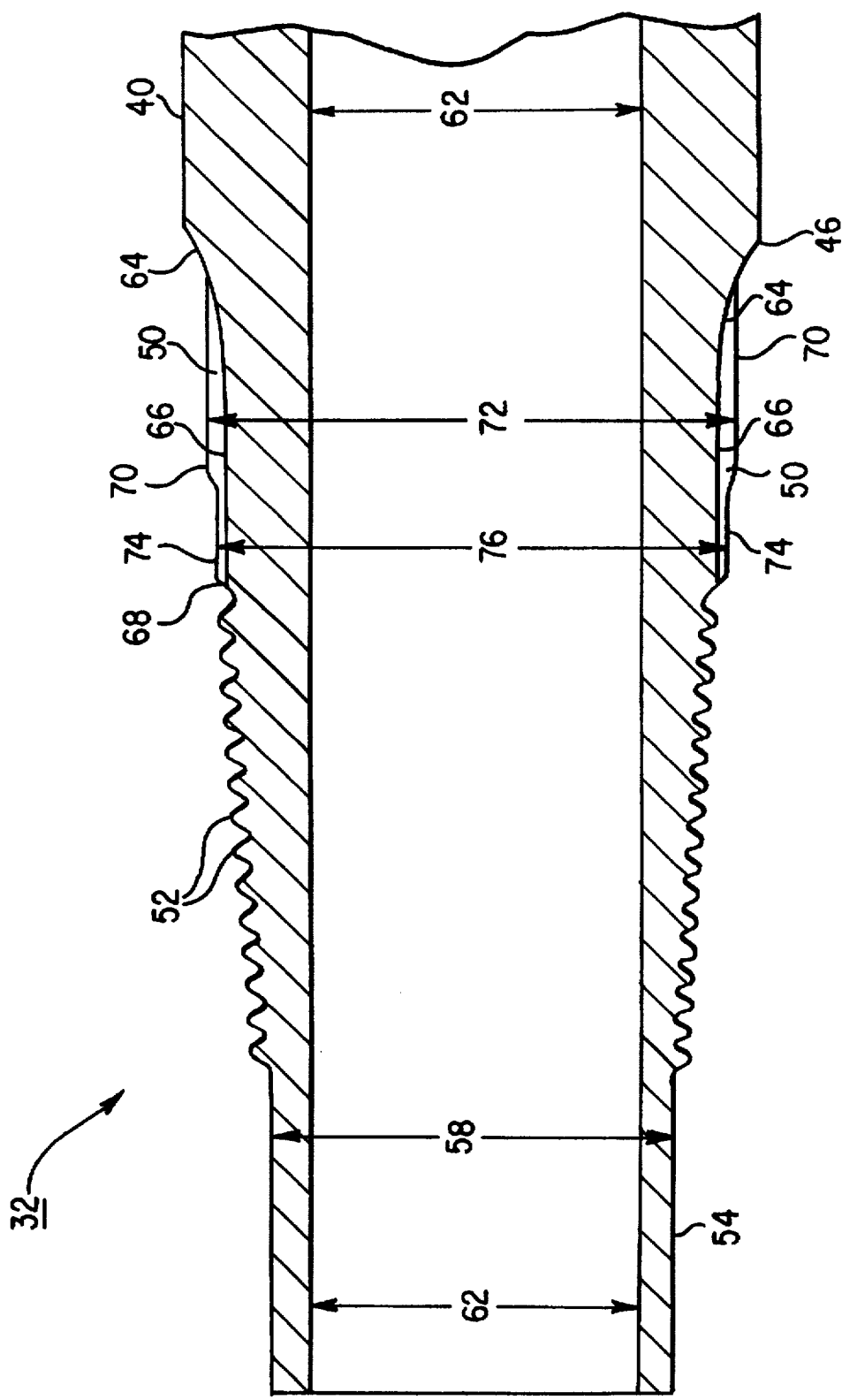
FIG. 4 is a sectional view of the male end adapter taken along the line 4—4 of FIG. 3.

As depicted in FIG. 4, the male end adapter 32 has a constant interior diameter 62 along its entire length. The surface of the male end adapter 32 between each pair of adjacent splines 50 has a tapered surface 64 and a near cylindrical surface 66. The tapered surfaces 64 begin at the lip 46 and extend to the cylindrical surfaces 66. The near cylindrical surfaces 66 extend from the tapered surfaces 64 to the terminal end 68 of the screw threads 52. Each spline 50 has a first edge section 70 defining a first outer diameter 72 and a second edge section 74 defining a second outer diameter 76.

Figures 5, 6:
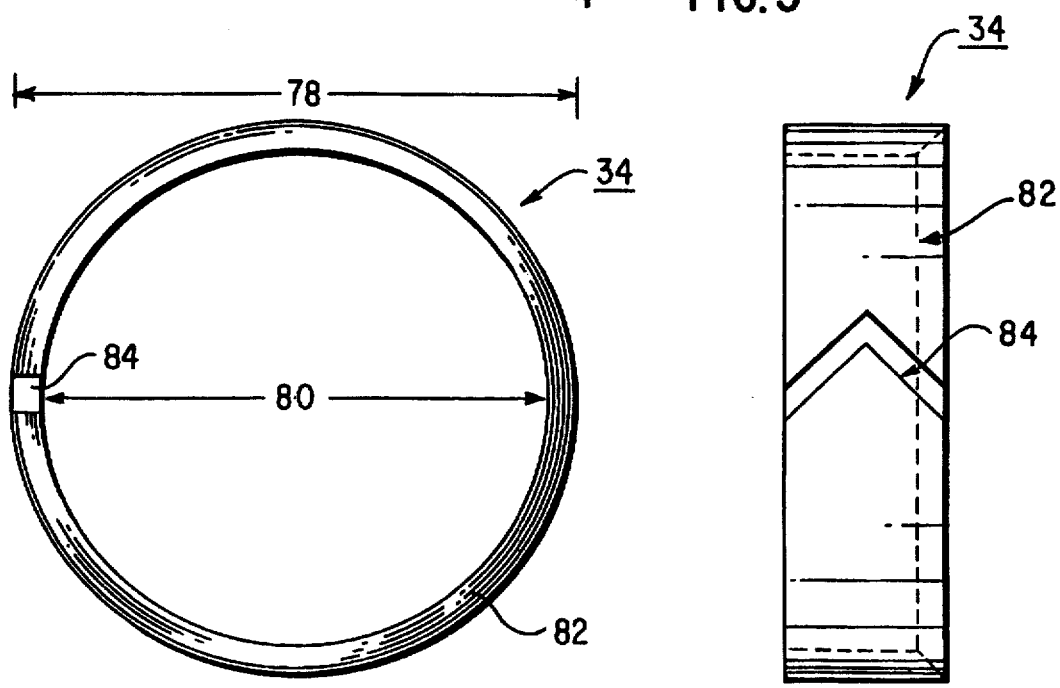
FIG. 5 is an end elevation view of the lock ring of the locking pipe joint of FIG. 1.
FIG. 6 is a side elevation view of the lock ring of FIG. 5.

The locking ring 34 (FIG. 5) is a circular spring with an inner diameter 80 that is slightly smaller than the first outer diameter 72 defined by the first edge section 70 of the splines 50. When locked in place around the splines 50, the locking ring 34 has an outer diameter 78 equal to the outer diameter 44 of the first tubular section 40 of the male end adapter 32. The locking ring 34 has a tapered inner edge 82 extending along a portion of the width of the locking ring 34. The tapered inner edge 82 is depicted in FIG. 6 by dash lines. The locking ring 34 also includes an expansion slit 84. The tapered inner edge 82 interacts with the tapered surface 64 with the locking ring 34 in place resting on the first edge section 70 of the splines 50.

The ring 34 is moved by applying a force to the locking ring 34 in a direction toward the first tubular section 40. With this force applied, the tapered edge 82 of the locking ring 34 interacts with the tapered surface 64 of the male end adapter 32 causing the expansion slit 84 to expand and the locking ring 34 to expand radially outward and move axially toward and up onto the first tubular section 40.

The shear ring 36 (FIG. 7) includes a mounting ring 86 and a plurality of evenly spaced shear plates 88 distributed around the mounting ring 86. The shear ring 36 has an outer diameter 90 generally the same as the first outer diameter 44 of the male end adapter 32. The shear ring 36 has a first inner diameter 92 defined by the inner surface of the mounting ring 86 and a second inner diameter 94 defined by the innermost edges of the shear plates 88.

As depicted in FIG. 8, the shear plates 88 and mounting ring 86 form a cylindrical surface along the longitudinal width 96 of the shear ring 36, with the shear plates 88 extending longitudinally from the mounting ring 86 to form cantilevered fingers. In the preferred embodiment of the present invention, there are twenty-four shear plates 88 equally distributed and mounted to the mounting ring 86.

Figure 10:
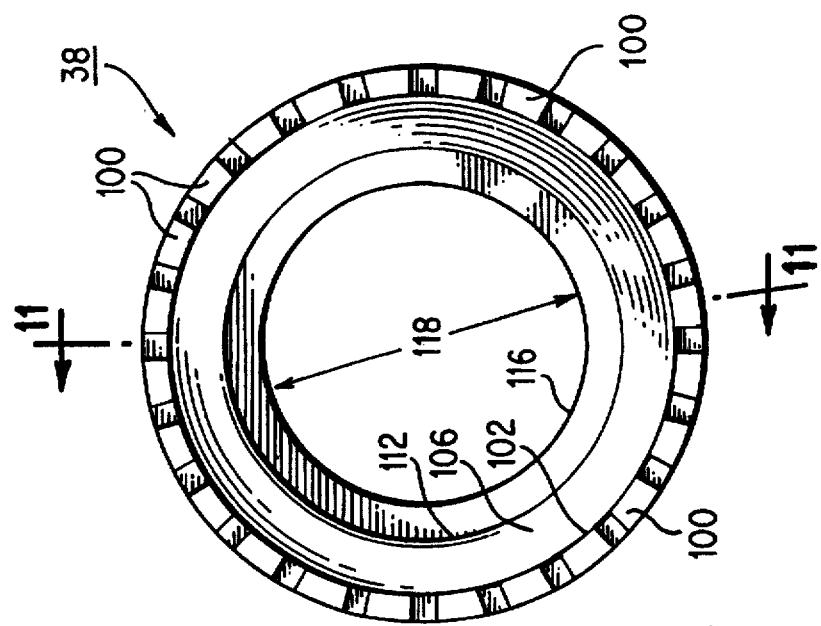
FIG. 10 is an end view of the female end adapter of FIG. 9.
Figure 9:
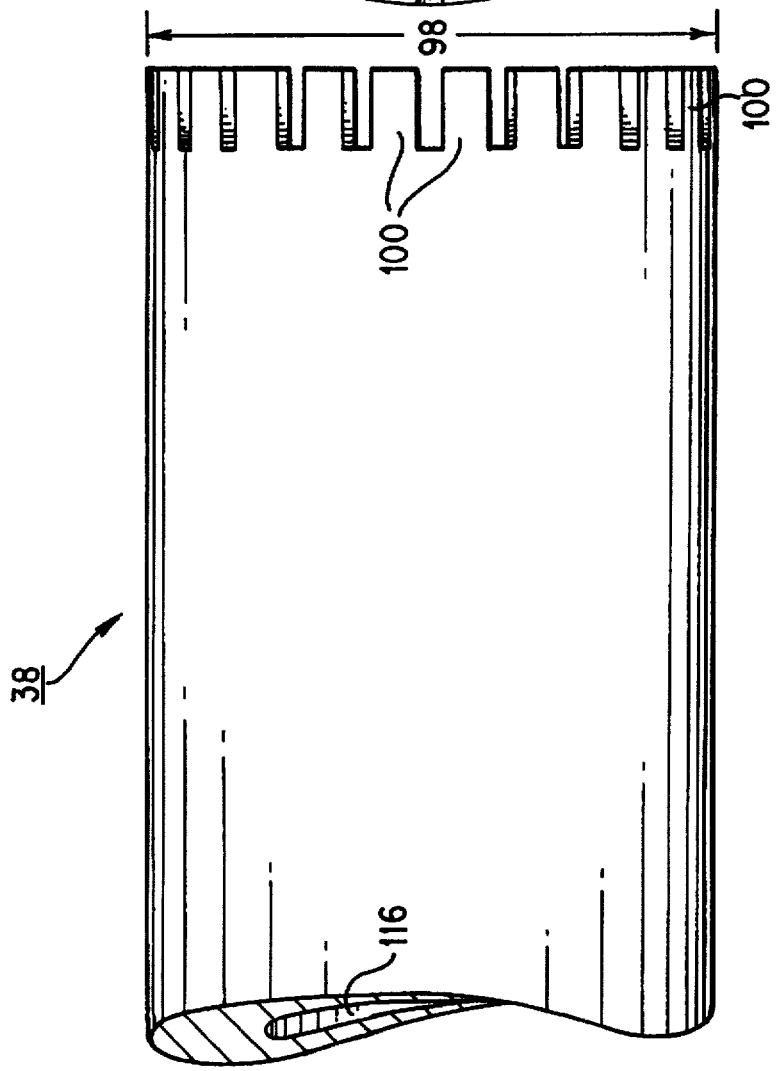
FIG. 9 is a side elevation view of the female end adapter of the locking pipe joint of FIG. 1.

The female end adapter 38 (FIG. 9) has an outer diameter 98 which is preferably the same as the first outer diameter 44 of the first tubular section 40 of the male end adapter 32. Cantilevered fingers 100 are formed between longitudinal slots in the end of the female end adapter 38. As depicted in FIG. 10, the cantilevered fingers 100 are evenly spaced around the end of the female end adapter 38. In the preferred embodiment of the present invention, there are twenty-four cantilevered fingers 100.

Figure 11:
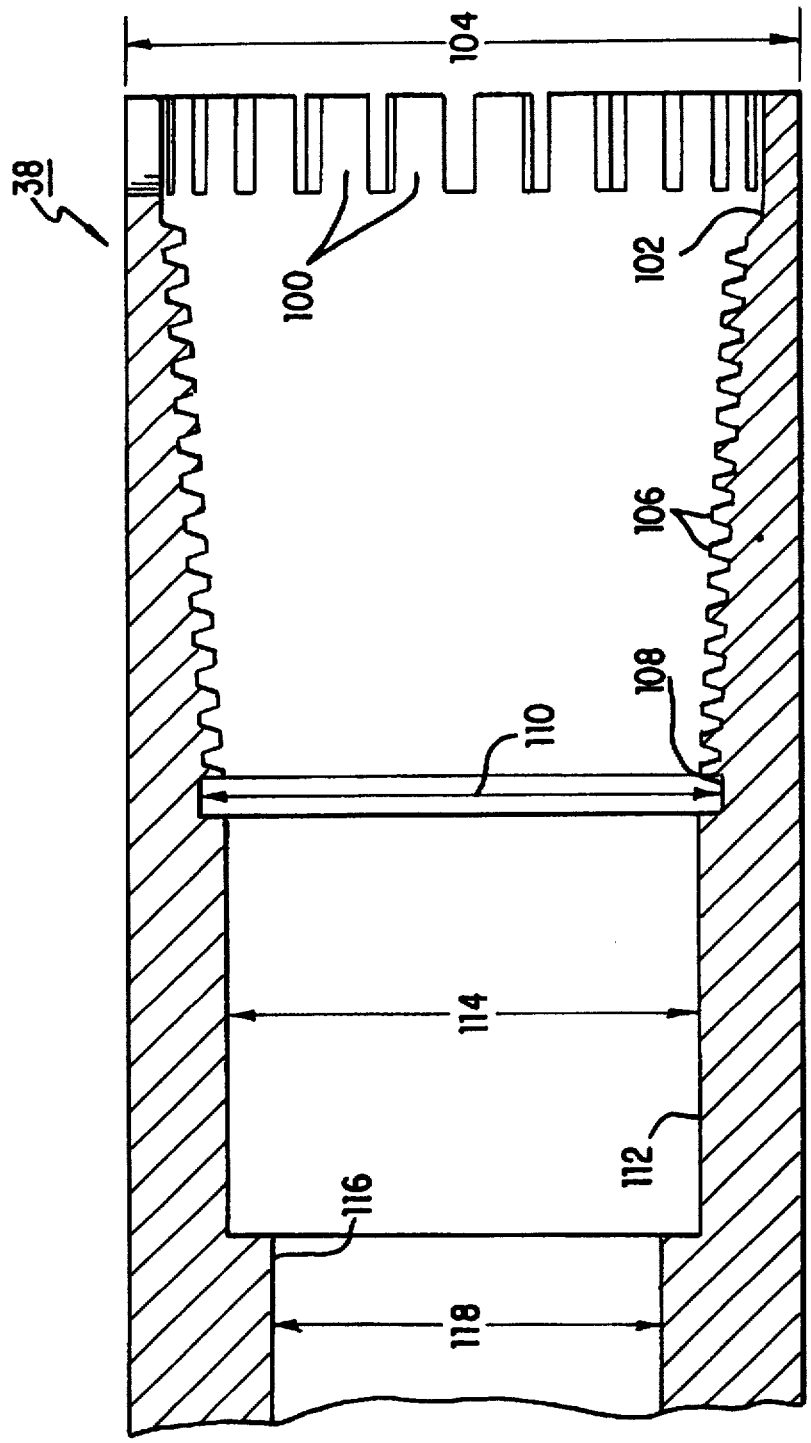
FIG. 11 is a sectional view of the female end adapter taken along the line 11—11 of FIG. 10.

The inner surface of the female end adapter 38 (FIG. 11) consists of sections having stepped interior diameters. A first cylindrical inner surface 102 is formed having a first bore diameter 104. The first cylindrical surface 102 is followed by a second surface which tapers inward and carries a pair of tapered screw threads 106. At the end of the screw threads 106, a second cylindrical surface 108 is formed with a second bore diameter 110 smaller than the first bore diameter 104.

A third cylindrical surface 112 is formed contiguous with the second cylindrical surface 108. The third cylindrical surface 112 has a third bore diameter 114 less than the second bore diameter 110. A fourth inner cylindrical surface 116 extends longitudinally the remaining length of the female end adapter 38. The fourth cylindrical surface 116 has a bore diameter 118 less than the third bore diameter 114.

Figure 15:
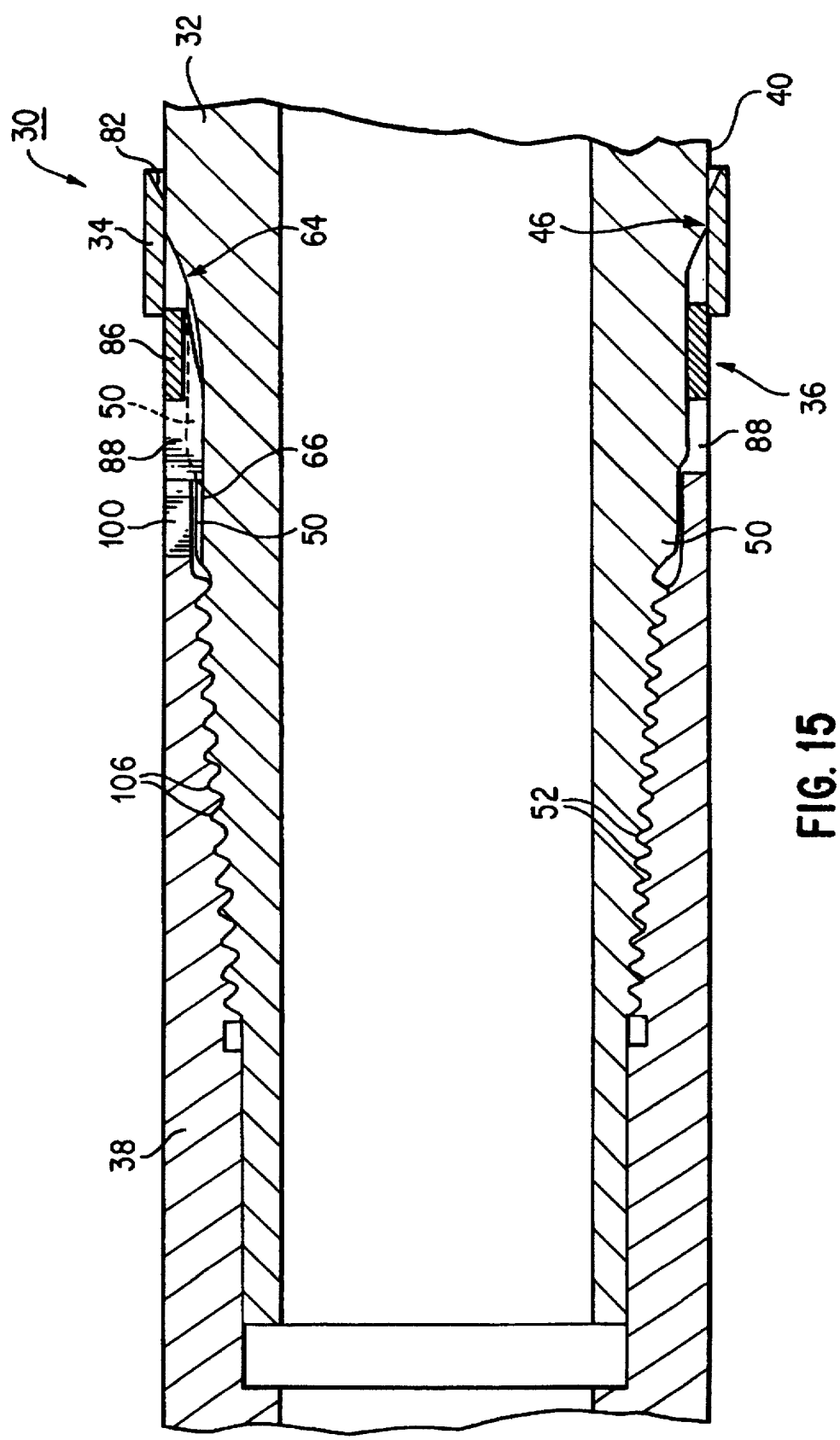
FIG. 15 is a sectional view like FIG. 13, depicting the shear plates of the shear ring disengaged from the cantilevered fingers of the female end adapter.

Referring now to FIG. 15, to engage the locking pipe joint 30, the male end adapter 32 is inserted through the locking ring 34. The locking ring 34 is pressed longitudinally up and over the lip 46 formed at the edge of the tapered section 64 on the male end adapter 32. The tapered inner edge 82 of the locking ring 34 facilitates the movement of the locking ring 34 up and over the lip 46 when a longitudinal force is applied to the locking ring 34 causing the expansion slit 84 to open.

The shear ring 36 is then slid onto the male end adapter 32, with the mounting ring 86 first, such that each shear plate 88 is positioned within a corresponding space between the splines 50 on the male end adapter 32. With the shear ring 36 slid toward the lip 46, the male end adapter 32 is in position to receive the female end adapter 38.

Figure 14:
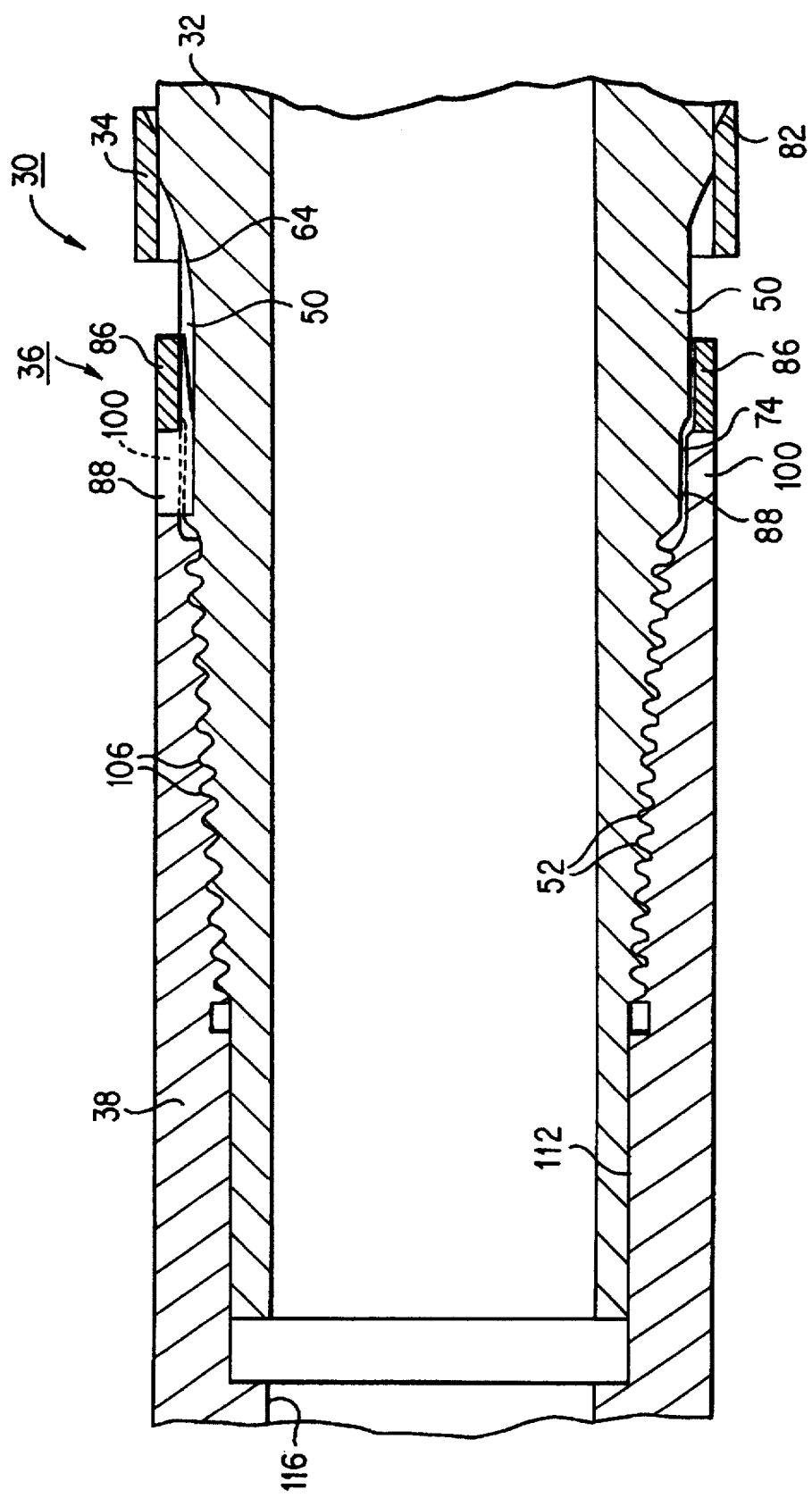
FIG. 14 is a sectional view like FIG. 13, depicting the shear plates of the shear ring engaged within the cantilevered fingers of the female end adapter.

The distal end of the male end adapter 32 is placed in the female end adapter 38 such that the pair of screw threads 52 on the male end adapter 32 engage the screw threads 106 on the female end adapter 38. The female end adapter 38 is then screwed fully onto the male end adapter 32 to the position shown in FIG. 14.

To lock the male end adapter 32 to the female end adapter 38, the shear ring 36 is then slid toward the female end adapter 38, such that the shear plates 88 are engaged between the cantilevered fingers 100 and also between the splines 50. To engage the shear ring 36 to lock the male end adapter 32 to the female end adapter 38, the male end adapter 32 and female end adapter 38 may need to be turned slightly such that the cantilevered fingers 100 align with the splines 50. The shear plates 88 are then slid into the slots between the cantilevered fingers 100. In this position, the shear plates 88 are engaged both between the splines 50 and the cantilevered fingers 100 thus preventing relative rotation between the male end adapter 32 and the female end adapter 38.

Figure 13:
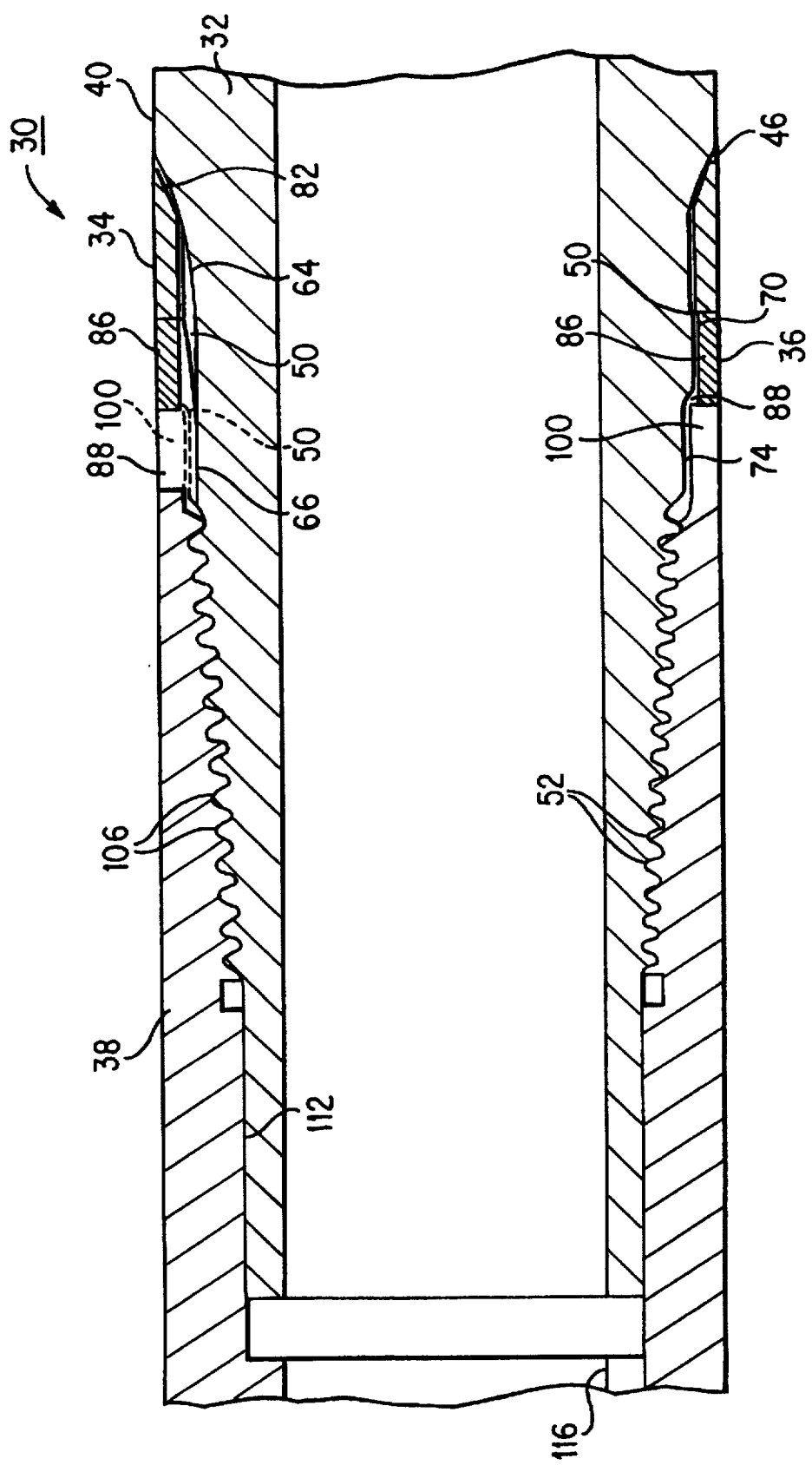
FIG. 13 is a sectional view of the locking pipe joint taken along the line 13—13 of FIG. 12, depicting the lock ring engaged within a recess in the male end adapter.

The locking ring 34 is then moved toward the shear ring 36 to lock the shear ring 36 in the position shown in FIG. 13. In the fully locked FIG. 13 position, the locking ring 34 rests within the recess formed above the first edge section 70 of the splines 50. In the FIG. 13 position, the lock ring 34, the shear ring 36, and the female end adapter 38 form a continuous outer cylindrical surface. This is desirable in applications where the locking pipe joint 30 encounters material having high frictional forces. Another advantageous feature of the illustrated embodiment of the invention is that the fully engaged locking pipe joint 30 has a nearly continuous inner cylindrical surface having a uniform diameter along its entire length.

In a preferred implementation of the invention, the first cylindrical section 40 of the male end adapter 32 has an outer diameter 44 of approximately one and three-quarter inches. The tapered screw threads 52 extend longitudinally approximately one and a half inches and are preferably twelve threads per inch, double lead. The length of the second tubular section 54 is approximately one inch, and the inner diameter 62 of the pipe joint may be approximately one inch. An entire penetrometer rod section having a female and a male end would be of a length which will provide 39.37 inches between corresponding points on adjacent sections.

Figure 16:
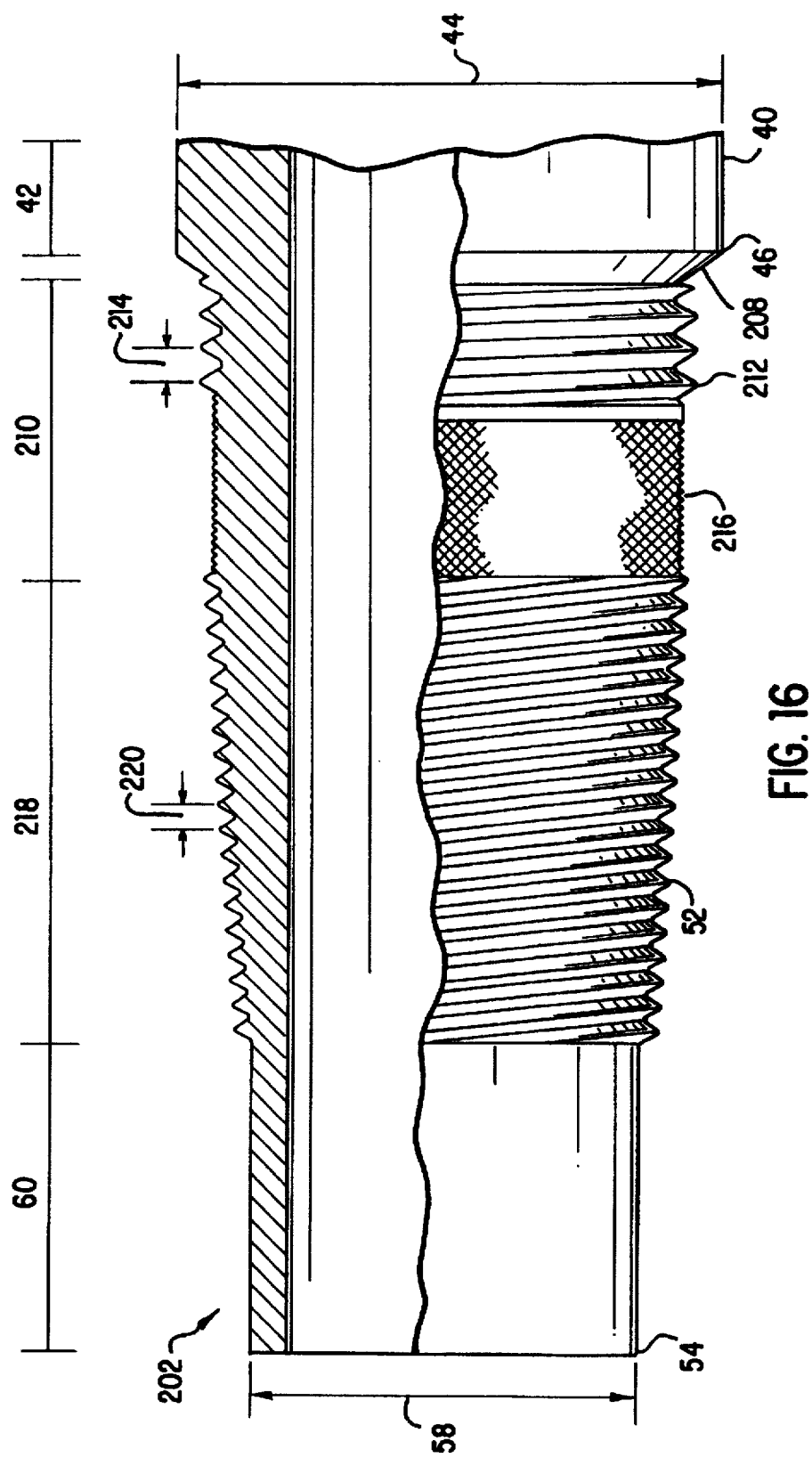
FIG. 16 is a side elevation view and partial sectional view of a male end adapter of a locking joint in accordance with another preferred embodiment of the present invention.
Figure 17:
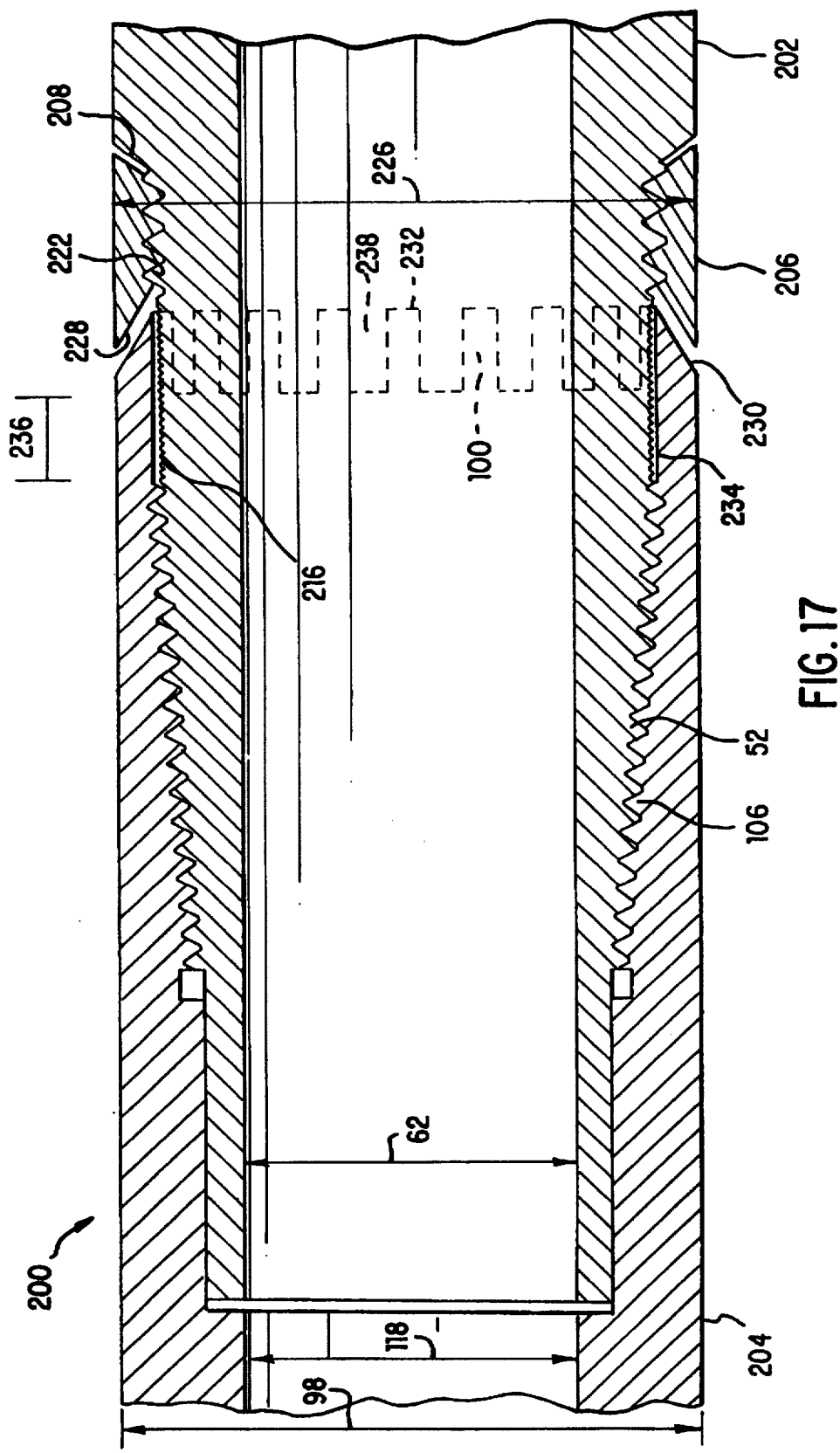
FIG. 17 is sectional view depicting the male end adapter of FIG. 16 threaded into a female end adapter to form the locking joint, with the cantilevered fingers of the female end adapter disengaged from the knurled surface of the male end adapter.
Figure 18:
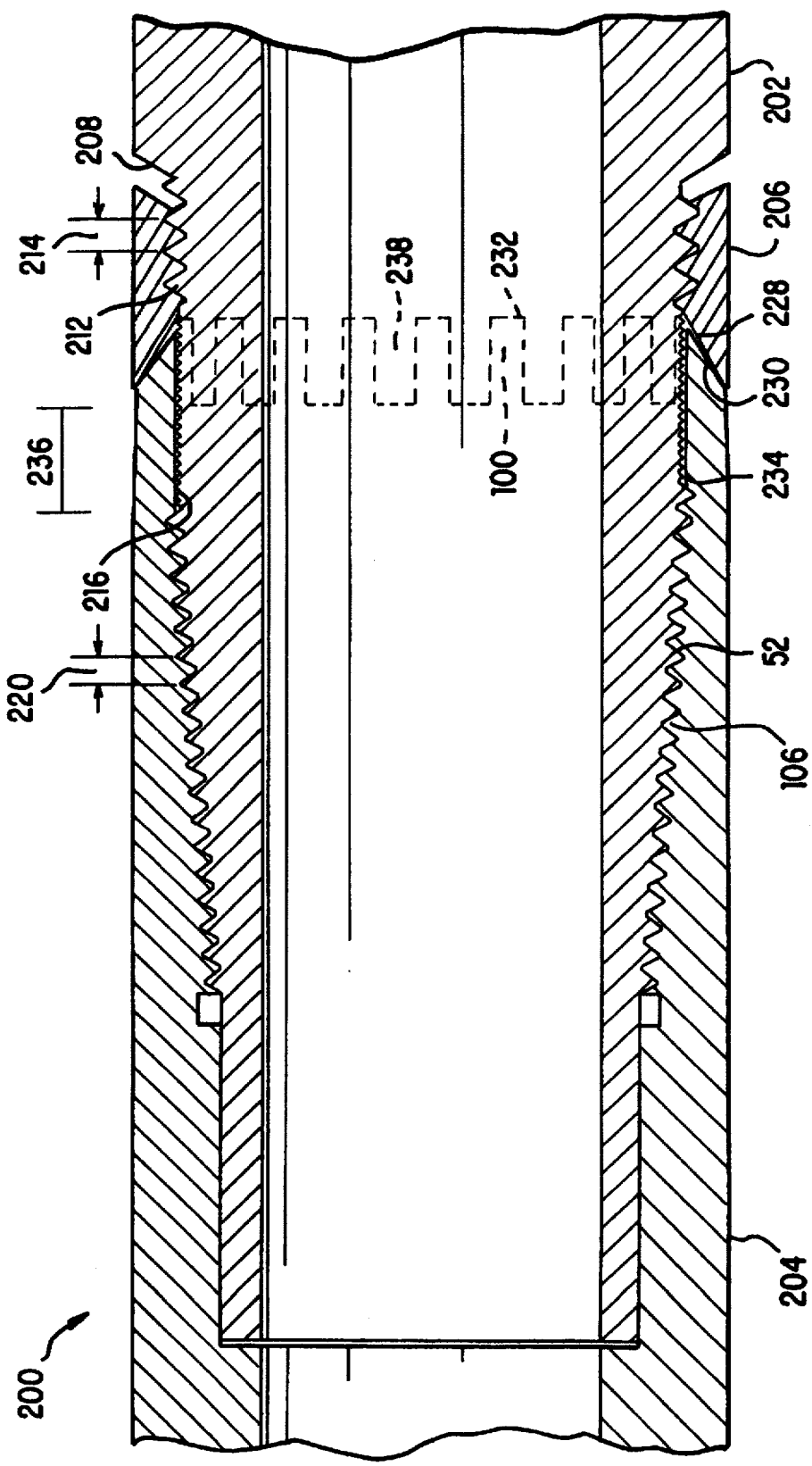
FIG. 18 is sectional view like FIG. 17, depicting the cantilevered fingers of the female end adapter engaged with the knurled surface of the male member.

Refer now to FIGS. 16–18 showing another embodiment of the present invention. This embodiment of the locking joint 200 (FIG. 17) has three pieces: a male end adapter 202, a female end adapter 204, and a clamp ring 206. FIG. 16 shows the male end adapter 202. The male end adapter 202 includes a first cylindrical tubular section 40 extending over a length 42 of the male end adapter 202. The first cylindrical tubular section 40 has an outer diameter 44 which is generally constant over its length 42. The first cylindrical section 40 terminates at a lip 46 formed at the edge of a fillet section 208. The fillet section 208 extends from the first cylindrical tubular section 42 to an intermediate cylindrical portion 210 of the male end adapter 202.

A first pair of screw threads 212, e.g., double lead threads, is formed within the intermediate cylindrical portion 210 of the male end adapter 202. The pitch 214 (i.e., the distance between the threads) of the threads 212 is relatively fine so that the threads 212 will affect a minimum radial depth of the threaded members 202, 206 (FIG. 17) and minimize stress levels. The double lead construction of the threads 212 makes it possible to employ fine threads 212 and still permit rapid assembly. In a preferred embodiment of the present invention, the first pitch 214 is ten threads per inch.

A knurled portion 216 extends from the finely threaded intermediate cylindrical portion 212 to a tapered section 218 of the male end adapter 202. A second pair of tapered screw threads 52, e.g., double lead threads, is formed within the tapered section 218 of the male end adapter 202. The double lead construction of the screw threads 52 offers the same advantages as described above. In a preferred embodiment of the present invention, the pitch 220 of the second screw threads 52 is twelve threads per inch. Also in a preferred embodiment, the second screw thread 52 has more threads per inch than the first screw thread 212 does and the pitch 214 of the first screw threads 212 is larger than the pitch 220 of the second screw threads 52.

A second tubular section 54 extends longitudinally from the screw threads 52 to the terminal end of the male end adapter 202. The second tubular section 54 has an outer diameter 58 which is substantially constant along its length 60. The second tubular section 54 guides the adapters 202, 204 (FIG. 17) during assembly, thereby protecting the fine threads 52 from becoming crossed or stripped. The second tubular section 54 also helps support the moment carried by the joint 200, which reduces joint deflection under lateral loads, i.e. loads acting perpendicularly to the axis extending through the pipes. The male end adapter 202 may have a constant interior diameter 62 along its entire length, FIG. 17.

The clamp ring 206 has an inner surface 222 that is threaded to be engageable with the first threads 212 of the male end adapter 202. The clamp ring 206 has an outer diameter 226 that is the same as the outer diameter 44 (FIG. 16) of the male end adapter 202. When the clamp ring 206 is screwed entirely onto the male end adapter 202, as shown in FIG. 17, the two pieces 202, 206 may form a continuous cylinder. The clamp ring 206 also includes a tapered surface 228 which engages the female end adapter 204 when the female and male end adapters 202, 204 are jointed and the clamp ring 206 is unscrewed to the position shown in FIG. 18. For reference, the screwed direction for the clamp ring 206 is from the left of the figures to the right and the unscrewed direction is from the right of the figures to the left.

As seen in FIG. 17, the female end adapter 204 includes cantilever fingers 100 each of which has a tapered outer surface 230. The surfaces 230 taper and together form a discontinuous cone such that the outer diameter of the female end adapter 204 decreases towards the distal ends 232 of the fingers 100. The inner surfaces 234 of the cantilever fingers 100 are cylindrical and shaped to fit closely around the knurled surface 216 of the male end adapter 202. The portion 236 of the female end adapter 204 between the screw threads 106 and the cantilever fingers 100 also is shaped to fit closely around the knurled surface 216.

To make the female end adapter 204 more economical to manufacture, the fingers 100 may have slots 238 cut into the end of the adapter 204. Because the slots 238 do not have tight tolerance requirements, the manufacturing costs are low.

To assemble the locking joint 200, the clamp ring 206 is screwed completely onto the male end adapter 202. The terminal end of the male end adapter 202 is placed in the female end adapter 204 such that the pair of screw threads 52 on the male end adapter 202 engage the screw threads 106 on the female end adapter 204. The female end adapter 204 is then screwed fully onto the male end adapter 202 to the position shown in FIG. 17.

In order to lock the male end adapter 202 to the female end adapter 204, the clamp ring 206 is threadably rotated (unscrewed) to the position shown in FIG. 18. When the clamp ring 206 is unscrewed, the clamp ring 206 and the female end adapter 204 may form a continuous cylinder. The clamp ring 206 ramps up over the tapered outer surface 230 of the fingers 100 and presses the fingers 100 tightly against the knurled portion 216. Unscrewing the clamp ring 206 creates a friction contact between the fingers 100 and the knurled portion 216 that secures the male and female end adapters 202, 204 together against relative rotation. The friction contact locks the joint 200 and enables the joint 200 to resist loosening when it is torqued in either direction.

If a torque begins to overcome the friction contact locking force, the female end adapter 204 will start to unscrew and move axially away from the male end adapter 202. The friction between the clamp ring 206 and the cantilever fingers 100 will cause the clamp ring 206 to unscrew from the male end adapter 202 as the female end adapter 204 turns. When the first pitch 214 is larger than the second pitch 220, i.e., greater distance between each thread, the clamp ring 206 presses harder on the fingers 100 as the female end adapter 204 unscrews. Thus, the joint 200 provides increased resistance to loosening as a result of a major torque.

In order to disassemble the joint 200, the clamp ring 206 is threadably moved back to the position shown in FIG. 17. Removing the clamp ring 206 from the female end adapter 204 eliminates the friction contact between the male and female end adapters 202, 204. The end adapters 202, 204 are then unscrewed from each other.

The joint 200 provides ease of assembly and disassembly. The joint 200 can be assembled and disassembled quickly and without the use of a special tool. When assembled, the joint 200 may be almost as strong as the pipes themselves. In tests in which a lateral load, i.e. one acting perpendicularly to the axis extending through the pipes, was placed on a pipe having the joint 200, the performance of the jointed pipe was almost equal to the performance of an unjointed pipe. Conventional joints are significantly weaker and must be reinforced in order to support the lateral loads borne by unjointed pipes. The present invention's strength both reduces the expense of reinforcing jointed pipe and expands the situations in which jointed pipes can be used.

Figure 19:
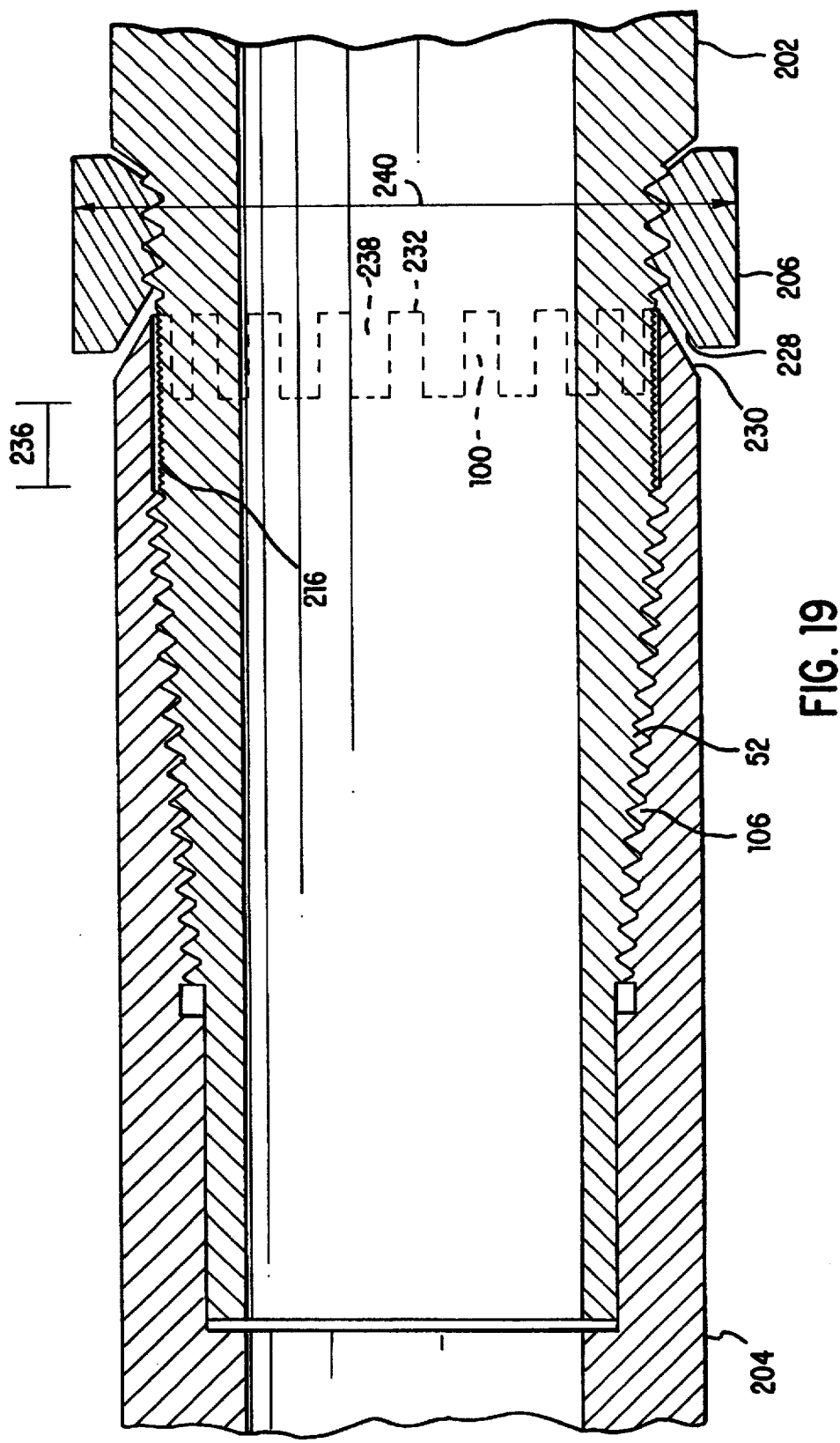
FIG. 19 is a sectional view like FIG. 17, depicting another embodiment of the locking joint according to the present invention.

Another advantage of the present invention is its ability to eliminate the need to weld oversized rings to penetrometer rods to reduce friction on the rod. Penetrometer operators sometimes reduce the friction on a rod by adding an oversized ring at every third joint. The oversized ring covers one meter of the pipe at each interval. If the outer diameter 240 of the clamp ring 206 is increased to be greater than the outer diameter 44 of the rod, as depicted in FIG. 19, then the joint 200 acts as if an oversized ring were welded to the rod. The present invention, therefore, can achieve the same desirable effects with fewer parts and fewer manufacturing and assembling steps.

The above description is only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A locking joint, comprising:
   a first adapter having a first portion, a second threaded portion and a first knurled contact portion;
   a second adapter having a threaded portion and a second contact portion;
   said second threaded portion of said first adapter being engageable with said threaded portion of said second adapter; and
   a clamp ring coupled to the first adapter and movable axially along said first adapter from a first position to a second position to move said second contact portion into engagement with said first knurled contact portion to prevent relative rotation between said first adapter and said second adapter.

2. The locking joint of claim 1, wherein said contact portion of said second adapter includes fingers forming a castellated end.

3. The locking joint of claim 2, wherein said fingers are cantilevered.

4. The locking joint of claim 1, wherein said first portion of said first adapter is threaded, and wherein said clamp ring includes a threaded inner surface for engaging said threaded first portion of said first adapter.

5. The locking joint of claim 1, wherein said adapters are tubular.

6. The locking joint of claim 5, wherein said first adapter fits into said second adapter.

7. The locking joint of claim 6, wherein said second portion of said first adapter has tapered threads, and wherein said threaded portion of said second adapter is tapered.

8. The locking-joint of claim 7, wherein said second adapter includes a tapered engagement portion, and wherein said clamp ring has a tapered edge for contacting said tapered engagement portion.

9. The locking joint of claim 8, wherein said second adapter and said clamp ring form a continuous cylindrical surface when said locking joint is in a locked position.

10. The locking joint of claim 1, wherein the diameter of said clamp ring is greater than the diameter of said adapters.

11. A locking joint, comprising:
- a first end adapter having a first threaded portion having a first pitch, a second threaded portion having a second pitch, and a knurled portion;
- a second end adapter having a threaded portion and a castellated end, said castellated end including a plurality of cantilever fingers each having an inner surface, an outer surface and a distal end;
- said second threaded portion of said first end adapter being engageable with said threaded portion of said second end adapter; and
- a clamp ring having an inner screw thread engageable with said first threaded portion of said first end adapter; and
- wherein said outer surfaces of said fingers are tapered toward said distal end;
- wherein said clamp ring includes a tapered surface which interacts with said outer surfaces of said fingers;
- wherein said first pitch of said first threaded portion of said first end adapter is larger than said pitch of said threaded portion of said second end adapter; and
- wherein said clamp ring engages said knurled portion of said first end adapter, the inner surfaces of said cantilever fingers engaging said knurled portion in response to engagement of the clamp ring with said cantilever fingers.

12. A method of making a locking joint, said method comprising the steps of:
- providing a clamp ring having a threaded inner surface;
- providing a male end adapter; providing a female end adapter;
- connecting said clamp ring to a male end adapter such that said threaded inner surface engages a first threaded portion of said male end adapter;
- connecting said male end adapter to a female end adapter such that a threaded portion of said female end adapter engages a second threaded portion of said male end adapter; and
- unscrewing said clamp ring to move the said cantilevered fingers on an end of said female end adapter to engage said knurled portion of said male end adapter, said knurled portion being located between said first and second threaded portions of said male end adapter.

* * * * *